Sept. 20, 1966  F. A. KVATERNIK  3,273,697
APPARATUS AND METHOD FOR CENTERING A CONVEYOR BELT
Filed Feb. 8, 1965  2 Sheets-Sheet 1
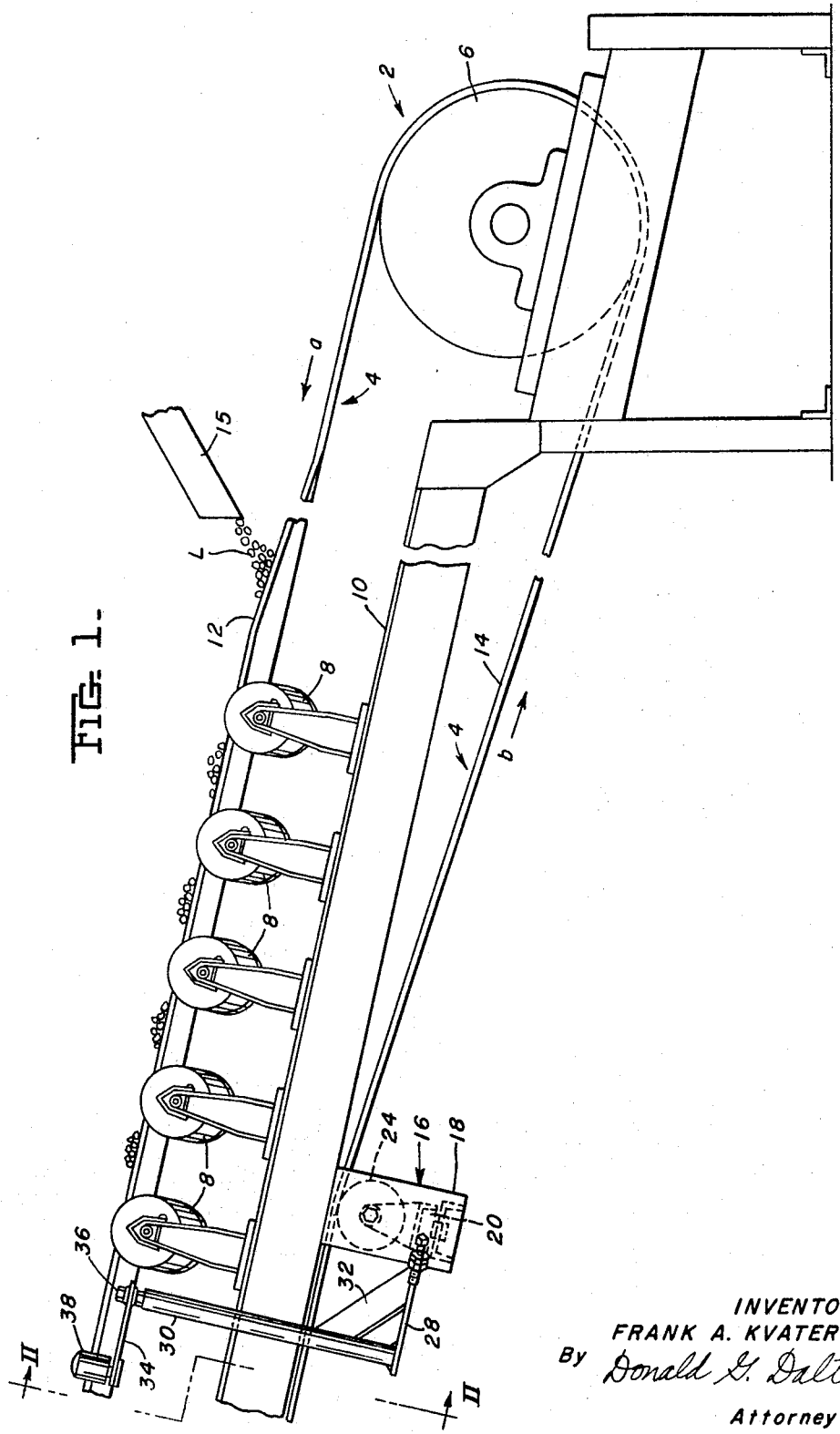
INVENTOR.
FRANK A. KVATERNIK
By Donald G. Dalton
Attorney

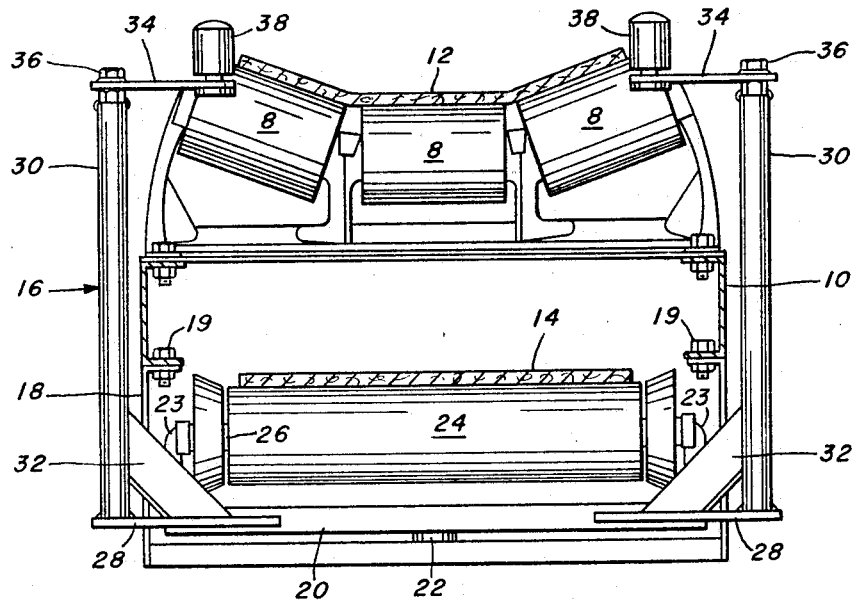
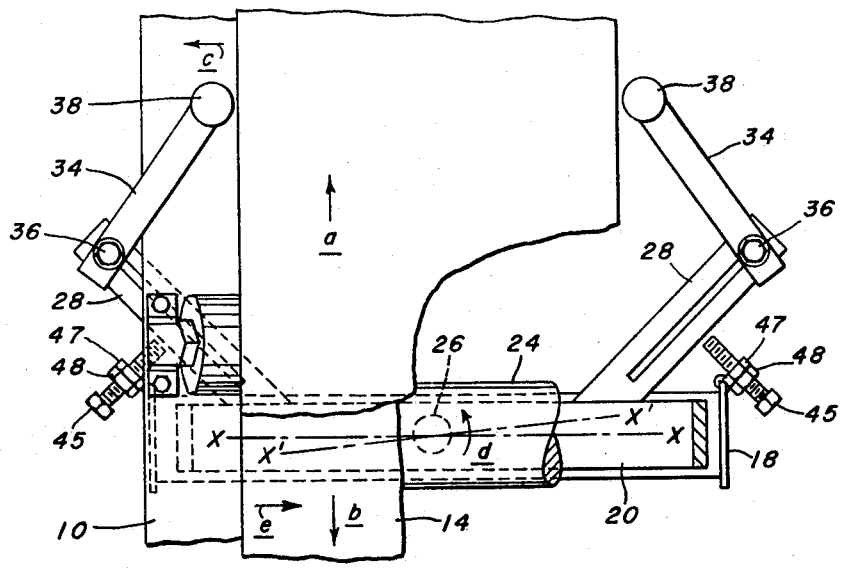
INVENTOR.
FRANK A. KVATERNIK
By Donald G. Dalton
Attorney

United States Patent Office 3,273,697
Patented Sept. 20, 1966

3,273,697
APPARATUS AND METHOD FOR CENTERING A CONVEYOR BELT
Frank A. Kvaternik, Eveleth, Minn., assignor to United States Steel Corporation, a corporation of Delaware
Filed Feb. 8, 1965, Ser. No. 430,863
8 Claims. (Cl. 198—202)

This invention relates to an improved method and apparatus for centering a conveyor belt which has moved to one side on its pulleys. More particularly, the subject apparatus is of the type which centers the belt by means of a training idler.

With prior conveyor belt centering devices and methods of this type, such as the one shown in U.S. Patent No. 1,510,051 issued Forbes on September 30, 1924, the practice has been to sense the off-center movement of the belt at or near the same place where the training idler or other belt correction means is located. The apparatus is normally placed on the top or load-carrying run of the belt, in order to sense quickly belt misalignments which are caused to a great extent by the uneven distribution of the load on the top run. However, when the training idler portion of the centering apparatus is mounted so as to engage the load-carrying run, the correction of these misalignments is made difficult by the weight of the load carried on that run.

Another problem experienced with prior belt training devices is in maintaining belt alignment at the place where materials are being loaded. This is an area where the belt is constantly subjected to the impact of falling materials, and the belt is carried off-center both by the forces attending such impact and by the frequent build-up of materials which spill over onto the nearby tail pulley and idlers. If a misalignment occurring in the loading area is to be corrected quickly, the best place to sense it is immediately in front of the loading area. On the other hand, if the training means is also located at this point, then the belt must make almost a complete revolution before the recentering effect of the training idler is observed at the loading section. With a long conveyor belt that is not moving too rapidly, this could mean a long time delay, during which the loading conditions and the forces tending to move the belt off-center may have completely changed.

It is an object of my invention to provide an improved method of centering a conveyor belt wherein misalignments are quickly sensed and corrected and the above-described difficulties of centering conveyor belts are overcome.

Another object of my invention is to provide improved apparatus for centering a conveyor belt which quickly senses and corrects misalignments and overcomes the above-described difficulties.

These and other objects will appear more readily from the following detailed description of my invention and the attached drawings in which:

FIGURE 1 is a side elevation of apparatus for centering a conveyor belt, mounted on a typical conveyor installation;

FIGURE 2 is a sectional view taken through lines II—II of FIGURE 1; and

FIGURE 3 is a top plan view of the apparatus of FIGURE 1.

In FIGURE 1, one end of a conveyor 2 is shown having a belt 4 which travels around a tail pulley 6 and on troughing idlers 8. The pulleys 6 and idlers 8 are rotatably mounted upon a conveyor frame 10. The conveyor belt 4 has a conveying run 12 and a return run 14. In normal operation, the run 12 travels in the direction of arrow $a$ and the run 14 travels in the direction of arrow $b$. Materials to be transported by the conveyor 2, such as load L, are dumped upon the conveying run 12 from a loading trough 15 in front of the tail pulley 6.

A belt-centering apparatus 16 is mounted on the underside of conveyor frame 10. This apparatus may be placed anywhere along the length of the conveyor, but in the preferred embodiment shown and described herein, it is attached to the frame 10 beneath the idlers 8. The main supporting member of apparatus 16 is a U-shaped frame member 18, attached by bolts 19 to the conveyor frame 10 (FIGURE 2). An idler support 20 is pivotally mounted on the bracket 18 by means of stub shaft 22. The support 20 has upwardly extending arms 23, between which is supported a rotatable training idler 24 on a stationary shaft 26. The idler 24 is in rolling engagement with the return run 14 of belt 4. Preferably, the elevation of the idler 24 is such that the idler imparts a small upward deflection to the return run 14, as shown in FIGURE 1.

Brackets 28 are welded on either side of the idler support 20, and as shown in FIGURE 2, they extend laterally beyond the side edges of the conveyor frame 10 and the frame member 18. Rods 30 are welded on the outboard ends of the brackets 20, and braces 32 help support these rods perpendicular to the brackets. The rods 30 extend upwardly along the side of the conveyor to places laterally adjacent the top conveying run 12.

Arms 34 are attached to the tops of rods 30 by means of lock bolts 36. On the ends of the arms 34 are mounted rotatable belt-sensing rollers 38, which are held next to the conveying run 12, as shown in FIGURE 3. The rollers 38 are placed as close to the edges of the conveying run as possible, without touching the belt when it is centered on its pulleys. The positions of the rollers 38 may be adjusted by loosening lock bolts 36, and rotating the arms 34 toward or away from the belt. The bolts 36 are then retightened before the conveyor is put into operation.

The brackets 28 and arms 34 extend away from the training idler 24 in the direction of arrow $a$ (FIGURE 3), which is the direction of travel of the conveying run 12. In the preferred embodiment, the ends of the arms 34 holding the sensing rollers 38 extend in front of the belt troughing idlers 8 (FIGURE 1). This arrangement insures that an off-center movement of the conveying reach 12 against one of the rollers 38 will cause a rotation of the training idler 24 in the proper direction to exert a centering force on the return run 14.

When the conveyor belt 4 is centered during its operation, the training idler 24 is held with its axis of rotation X—X (FIGURE 3) perpendicular to the travel of the belt. Since the rollers 38 are held close to the conveying run of the belt, any tendency of the idler support 20 to rotate from a position normal to the belt while the conveying reach is traveling on-center will be prevented by the contact of one of the rollers 38 against the edge of the belt.

The training apparatus is designed to re-center the belt 4 when it moves laterally to either side. For instance, if the conveying run 12 of the belt should be carried off-center in the direction of arrow $c$ in FIGURE 3, the edge of the belt will contact the adjacent roller 38 and move it laterally in the same direction. This motion will be transmitted by arm 34, rod 30 and bracket 28 to the idler support 20, and all parts carried by the support 20 will be thereby rotated counterclockwise about the stub shaft 26 as indicated by arrow $d$ in FIGURE 3. This will cause the idler 24 to swing to a position wherein it rotates about an axis X'—X' (FIGURE 3), thereby imposing a lateral force on the return run 14 in the direction of arrow $e$. The return run will thus be moved in the direction of arrow $e$ until the belt 4 is centered on the tail pulley 6 and on the troughing idlers 8.

As the belt becomes centered, it will be moved against the sensing roller 38 on the right side of the conveyor, as viewed in FIGURE 3. This will in turn cause the idler support 20 to be rotated back toward its original position normal to the travel of the conveyor belt 4. However, due to the continued presence of the many forces tending to carry the belt off-center, the axis of idler 24 will probably not remain normal to the belt travel, but will continuously be carried from side to side to correct for belt misalignment.

It will be understood that when the conveying run 12 is carried off-center in the opposite direction from arrow c, the foregoing described movements of the apparatus 16 in re-centering the belt will be reversed.

The pivotal movement of the roller support 20 is limited by means of two set screws 45 threaded into nuts 47, welded to the frame member 18. The screws 45 are at the same elevation as brackets 28, and when idler support 20 rotates too far in either direction, one of these brackets will contact an end of one of the screws 45, thus stopping the movement of the support 20 and all of the parts carried thereby. Satisfactory results have been obtained when the screws 45 are adjusted to allow a maximum rotation of the support 20 of approximately one degree. When the screws are adjusted as desired, a locking nut 48 threaded on the screw 45 is tightened against the nut 47.

While one embodiment of my invention has been shown and described, it will be apparent that adaptations and modifications may be made without departing from the scope of the appended claims.

I claim:

1. Apparatus for centering a conveyor belt mounted on a pulley and having a conveying run and a return run with directions of travel respectively toward and away from said pulley, said apparatus comprising a belt-training idler in rolling contact with said return run, an idler support holding said idler rotatable about an axis substantially parallel to the plane of travel of said return run at the place of said rolling contact, a stationary frame having pivot means for rotatably supporting said idler support on a second axis substantially perpendicular to said plane of travel of the return run, means disposed adjacent an edge of said conveying run for sensing the movement of said edge thereagainst, and means connecting said sensing means to said idler support so that the movement of said edge of the conveying run against said sensing means causes said idler and said idler support to pivot about said second axis so as to move laterally said return run in the opposite direction of said lateral movement of the conveying run.

2. Apparatus for centering a conveyor belt mounted on a pulley and having a return run and a conveying run with directions of travel respectively toward and away from said pulley, said apparatus comprising a belt-training idler in rolling contact with said return run, an idler support holding said idler rotatable about an axis substantially parallel to the plane of travel of said return run at the place of said rolling contact, a stationary frame for supporting said idler support, pivot means on said stationary frame for rotatably supporting said idler support on a second axis substantially perpendicular to said plane of travel of the return run, an arm rigidly connected to said idler support and extending therefrom upstream with respect to the travel of said return run, and a belt contact sensing means mounted on said extending arm adjacent an edge of said conveying run, said sensing means and connected arm and idler support being rotatable about said pivot means in response to a lateral off-center movement against the sensing means by said conveying run so as to impose a training force on said return run in the opposite direction of said lateral movement of the conveying run, whereby said belt is moved back toward a centered position.

3. Apparatus of claim 2 including a second arm rigidly connected to said idler support and extending therefrom upstream with respect to the travel of said return run, and a second belt contact sensing means mounted on said second arm adjacent the opposite edge of said conveying run from said first sensing means.

4. Apparatus of claim 3 wherein each of said belt contact sensing means includes a guide roller rotatably mounted on its associated arm, each roller having a cylindrical surface in rolling engagement with said conveying run when the conveying run moves against the roller.

5. Apparatus for centering a conveyor belt mounted on a pulley and having a return run and a conveying run with directions of travel respectively toward and away from said pulley, said conveying run being equipped with a belt troughing means near said pulley, said apparatus comprising a belt-training idler in rolling contact with said return run, an idler support holding said idler rotatable about an axis substantially parallel to the plane of travel of said return run at the place of said rolling contact, a stationary frame for supporting said idler support, pivot means on said stationary frame for rotatably supporting said idler support on a second axis substantially perpendicular to said plane of travel of the return run, an arm rigidly connected to said idler support and extending therefrom away from said pulley and to a place in front of the end of said belt troughing means opposite said pulley, and a belt contact sensing means mounted on said arm adjacent an edge of said conveying reach and in front of said troughing means, said sensing means and connected arm and idler support being rotatable about said pivot means in response to a lateral movement against the sensing means by said conveying run so as to impose a training force on said return run in the opposite direction of said lateral movement of the conveying run, whereby said belt is moved back toward a centered position.

6. Apparatus for centering a conveyor belt mounted on a pulley and having a return run and a conveying run with directions of travel respectively toward and away from said pulley, said conveying run moving through a material loading station near said pulley, said apparatus comprising a belt-training idler in rolling contact with said return run, an idler support holding said idler rotatable about an axis substantially parallel to the plane of travel of said return run at the place of said rolling contact, a stationary frame for supporting said idler support, pivot means on said stationary frame for rotatably supporting said idler support on a second axis substantially perpendicular to said plane of travel of the return run, an arm rigidly connected to said idler support and extending therefrom away from said pulley and to a place on the opposite side of said loading station from said pulley, and a belt contact sensing means mounted on said arm adjacent an edge of said conveying reach and in front of said troughing means, said sensing means and connected arm and idler support being rotatable about said pivot means in response to a lateral movement against the sensing means by said conveying run so as to impose a training force on said return run in the opposite direction of said lateral movement of the conveying run, whereby said belt is moved back toward a centered position.

7. A method of centering a conveyor belt mounted on a pulley and having a return run and a conveying run with directions of travel respectively toward and away from said pulley, said method comprising the steps of sensing an off-center movement of said conveying run, applying in response to said sensing a lateral force on said return run in the opposite direction of said off-center movement of the conveying run, whereby said return run is guided toward a centered position prior to reaching said pulley.

8. A method of centering a conveyor belt mounted on a pulley and having a return run and a conveying run with directions of travel respectively toward and away from said pulley, said method comprising the steps of sensing an off-center movement of said conveying run near said pulley, applying in response to said sensing a lateral force on said return run in the opposite direction of said off-center movement of the conveying run, whereby said return reach is guided toward a centered position prior to reaching said pulley, then sensing the resultant centering of said conveying run near said pulley, and removing said lateral force on said return run in response to the latter sensing.

References Cited by the Examiner

UNITED STATES PATENTS

| | | | |
|---|---|---|---|
| 2,160,057 | 5/1939 | Carus et al. | 198—202 |
| 2,725,757 | 12/1955 | Murphy | 198—202 X |
| 2,914,957 | 12/1959 | Johnson | 198—202 X |

FOREIGN PATENTS 1,181,123  11/1964  Germany.

EVON C. BLUNK, *Primary Examiner.*

R. E. KRISHER, *Assistant Examiner.*